US006163094A

United States Patent [19]

Jansson

[11] Patent Number: 6,163,094

[45] Date of Patent: Dec. 19, 2000

[54] PORTABLE POWER TOOL WITH A HEAT SCREENING MEANS

[75] Inventor: Anders Urban Jansson, Älvsjö , Sweden

[73] Assignee: Atlas Copco Tools AB, Nacka, Sweden

[21] Appl. No.: 09/376,022

[22] Filed: Aug. 19, 1999

[30] Foreign Application Priority Data

Aug. 20, 1998 [SE] Sweden .................................. 9802778

[51] Int. Cl.[7] .............................. H02K 5/02; H02K 5/04; H02K 9/00

[52] U.S. Cl. ................................ 310/89; 310/50; 310/52; 310/64; 173/168

[58] Field of Search ................................. 310/64, 50, 52, 310/47, 89; 173/217, 218, 168, 169, 170; 415/108

[56] References Cited

U.S. PATENT DOCUMENTS

| | | | |
|---|---|---|---|
| 2,789,652 | 4/1957 | Fannen | 181/36 |
| 4,611,671 | 9/1986 | Hansson | 173/168 |
| 4,643,263 | 2/1987 | Karden | 173/168 |
| 5,136,197 | 8/1992 | Hallett | 310/83 |
| 5,669,453 | 9/1997 | Akzawa | 173/205 |

FOREIGN PATENT DOCUMENTS

| | | | |
|---|---|---|---|
| 42 38 564 | 5/1994 | Germany | H02K 9/02 |
| 1 437 304 | 5/1976 | United Kingdom | B24B 29/02 |

*Primary Examiner*—Burton Mullins
*Attorney, Agent, or Firm*—Frishauf, Holtz, Goodman, Langer & Chick, P.C.

[57] ABSTRACT

A portable power tool including a housing (10) intended for manual support of the tool and formed with an inner surface (29), and a motor (11) supported in the housing (10) and having a stator (22) surrounded by the inner surface (29) of the housing (10) leaving a space (30) wherein at least one heat screening shell (32;52) is provided to retard heat transfer between the motor (11) and the housing (10). Each heat screening shell (32;52) is preferably a thin sheet metal element which in itself has no heat insulating properties.

13 Claims, 4 Drawing Sheets

PORTABLE POWER TOOL WITH A HEAT SCREENING MEANS

BACKGROUND OF THE INVENTION

The invention relates to a portable power tool, comprising a housing which is intended for manual support of the tool and which is formed with an inner surface, and a motor located in the housing and comprising a stator which is surrounded by the inner surface of the housing.

The main problem to be solved by the invention is dividable into two different yet similar problems, namely heat surplus and heat deficit in the tool housing. Dependent on what type of motor, electric or pneumatic, the temperature of the tool housing is raised or lowered to levels which are uncomfortable for the tool operator if he gets into physical contact with or uses the tool housing as a tool supporting handle.

In the case of a pneumatic motor, the exhaust air leaving the motor has a very low temperature, and since the exhaust air is normally directed to and routed around the outside of the motor cylinder or stator the low temperature of the exhaust air is transferred to the surrounding housing. In order to protect the operator from this cold many tools of this type have been provided with an outer lining of a heat insulating plastic material which in many cases, however, has turned out to be insufficient to obtain a comfortable temperature on the outside of the tool housing.

In the case of an electric motor, there is developed heat in the motor stator during operation, and there is usually provided a cooling fan to direct a cooling air flow around the stator so as to transport heat out of the tool housing. This, sometimes in combination with a heat insulating outer lining on the housing, is not sufficient to prevent the housing temperature from being uncomfortably high.

In U.S. Pat. No. 4,643,263, there is described a heat insulating problem resembling the above described problem, as well as a solution to that problem.

In this prior art reference, there is described a portable pneumatic grinder having an air exhaust passage extending through a tubular handle. The handle is provided with an inner tube of a heat insulating material, like a synthetic resin. This inner tube is arranged with a circumferential air gap relative to the handle tube inside surface to, thereby, improve the heat insulating effect.

Differently from the invention, this known device is related to a problem where the available space is not critical for the arrangement of a heat transfer retarding device. Accordingly, the described plastic type heat insulating tube would be too space demanding for use as a heat screening device in a manually supported motor housing of a power tool.

OBJECT OF THE INVENTION

A primary object of the invention is to accomplish a power tool of the above related type in which the heat transfer between the motor and the tool housing is effectively reduced by the provision of a heat screening means located between the motor stator and the tool housing.

Other objects and advantages of the invention will appear from the following specification and claims.

BRIEF DESCRIPTION OF THE DRAWINGS

A preferred embodiment of the invention is below described in detail with reference to the accompanying drawings.

In the drawings.

DETAILED DESCRIPTION

Figure 1:
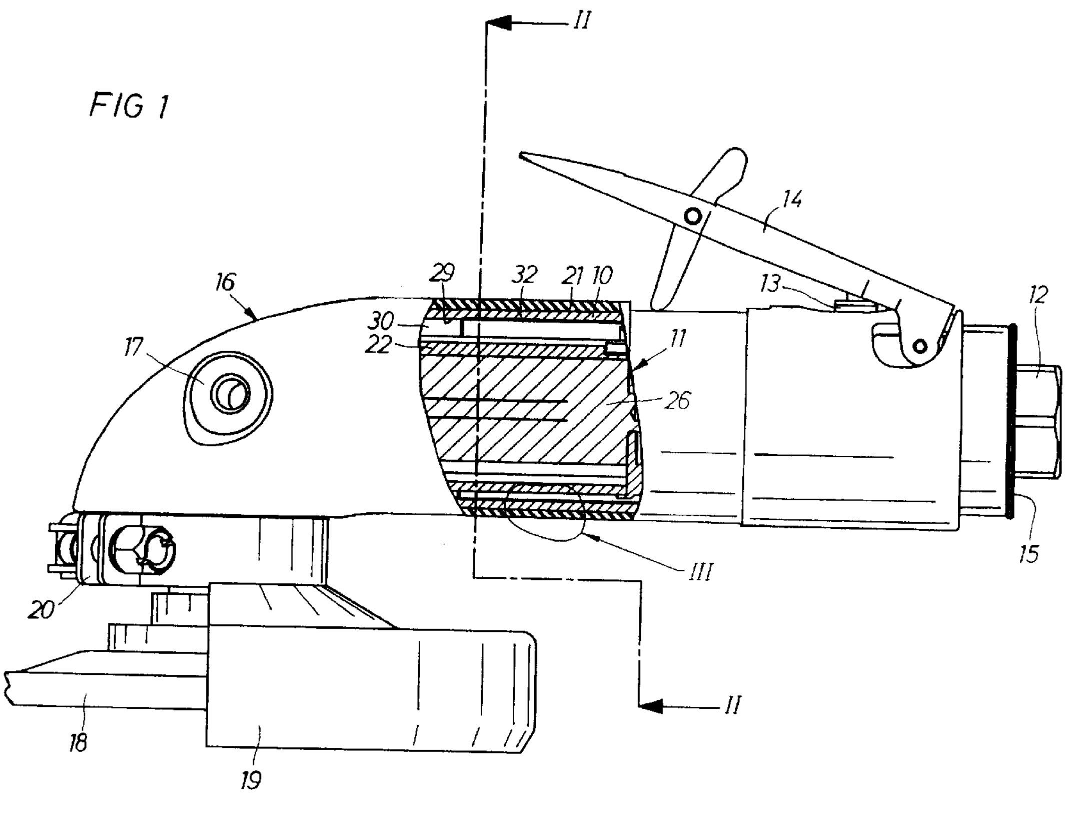
FIG. 1 shows a side view partly in section of a pneumatic angle grinder designed in accordance with the invention.

The power tool illustrated in the drawing figures is a pneumatic angle grinder intended for an alternative one-hand or two-hand operation. In both cases, the tool housing is to be grasped by the operator for supporting the tool. In the two-hand alternative, the operator also grasps a laterally extending handle. This means, however, that in any case the operator is in physical contact with the tool housing.

The power tool shown in FIG. 1 comprises a housing 10 in which are located a vane type pneumatic motor 11, a pressure air inlet 12, a throttle valve 13 manoeuvered by a lever 14, and a rear end exhaust air outlet 15. At the front end of the housing 10, there is disposed an angle head 16 which is formed with a mounting means 17 for attachment of an auxiliary handle and which encloses an angle drive by which the motor 11 is connected to an output shaft (not shown). The output shaft carries a grinding wheel 18, and a safety guard 19 which partly surrounds the grinding wheel 18 is adjustably mounted on the housing 10 by means of a clamping device 20. On its outside, the housing 10 is provided with a heat insulating plastic lining 21.

Figure 2:
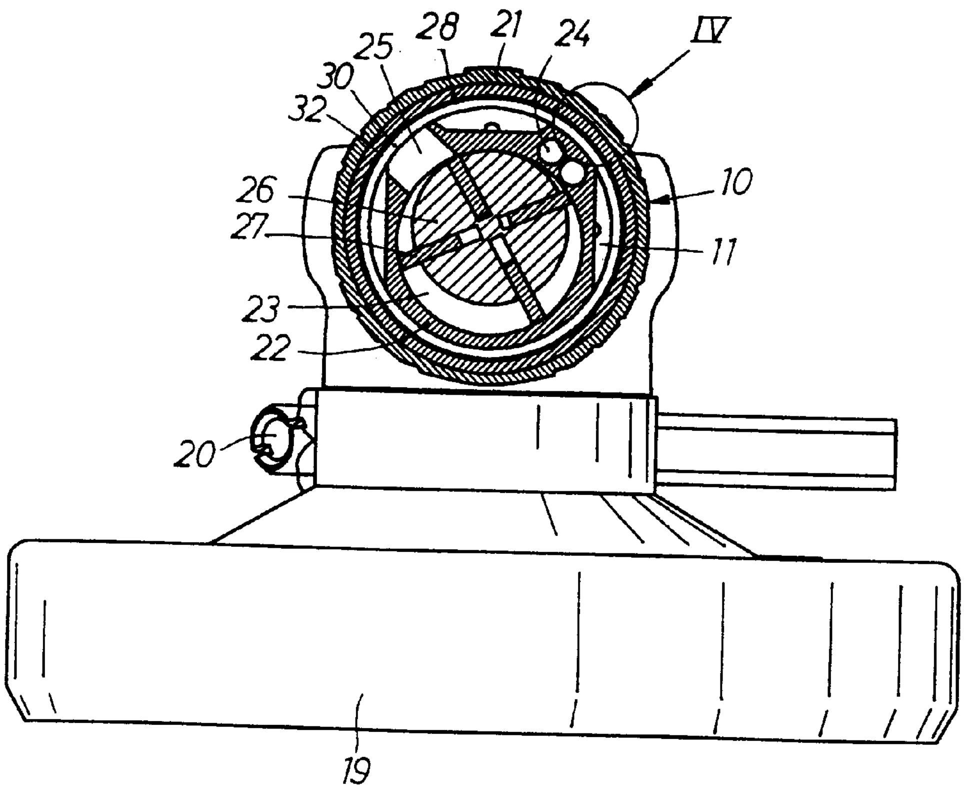
FIG. 2 shows a cross section along line II—II in FIG. 1.
Figure 3:
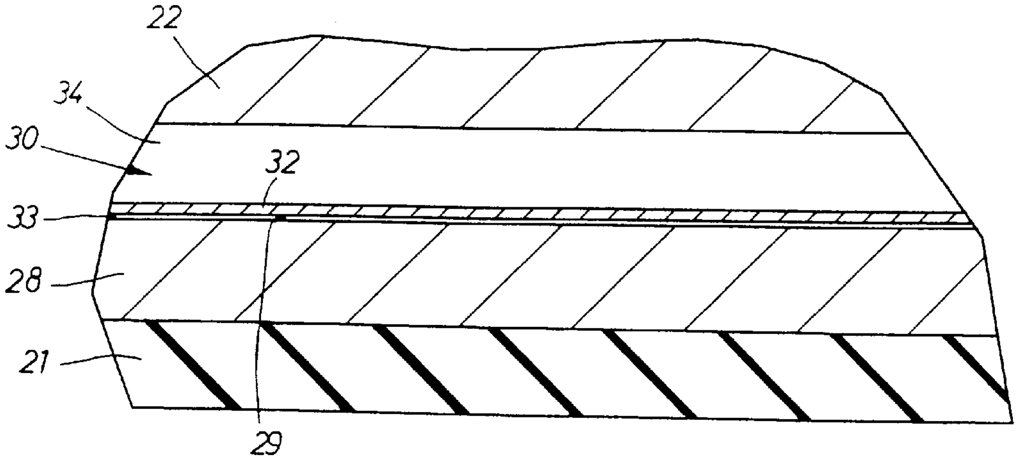
FIG. 3 shows, on a larger scale, a fractional section of the power tool as shown in FIG. 1.

As is best seen in FIGS. 1 and 2, the motor 11 comprises a cylinder or stator 22 which is formed with a cylindrical chamber 23, two axially directed pressure air inlet ports 24 and a laterally directed exhaust air outlet port 25.

Within the cylinder chamber 23 there is rotatively journalled a rotor 26 carrying radially movable vanes 27.

Figure 4:
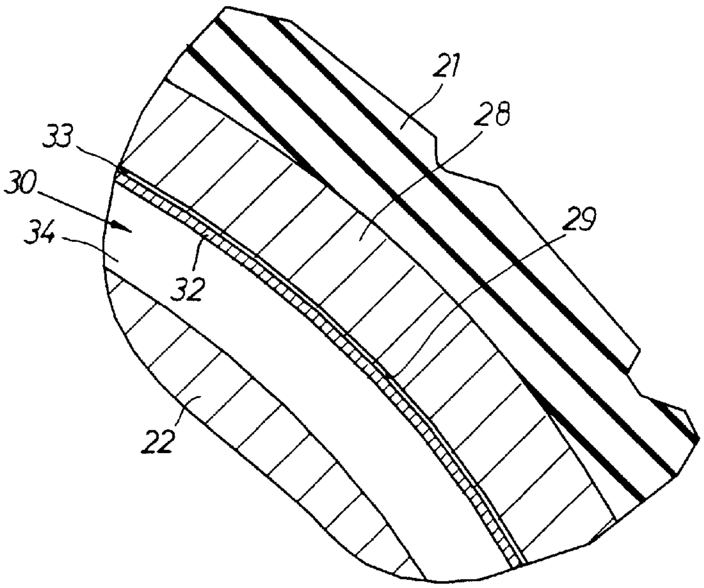
FIG. 4 shows, on a larger scale, a fractional section of the power tool as shown in FIG. 2.

The housing 10 comprises a cylindrical wall 28 with a cylindrical inner surface 29. See FIGS. 1, 2 and 4. Between the surface 29 and the motor stator 22 there is formed a substantially tubular space 30. Within the tubular space 30 there is disposed a heat screen in the form of a tubular sheet metal shell 32. Although other types material, as for instance plastics, might be used, sheet metal is superior since it makes it possible to keep down the thickness of the shell 32 to a few tenths of a millimeter, and thereby to keep down the outer transverse dimension of the tool housing for a certain motor size.

The heat screening effect of the shell 32 is based on the low heat transition coefficient existing between a gaseous medium and a solid material, and by the introduction of a heat screening shell 32 between the motor stator 22 and the housing 10 there is formed two extra air-to-metal heat transitions which effectively retard the heat transfer between the motor and the housing.

Accordingly, between the shell 32 and the inner surface 29 of the housing 10, there is formed a first air gap 33, and between the shell 32 and the stator 22 there is formed a second air gap 34. The second air gap 34, though, is several times wider than the first air gap 33 and is adapted to form a part of the exhaust air passage for communicating exhaust air from the motor outlet port 25 to the rear end of the housing 10 and the exhaust outlet 15.

Figure 6:
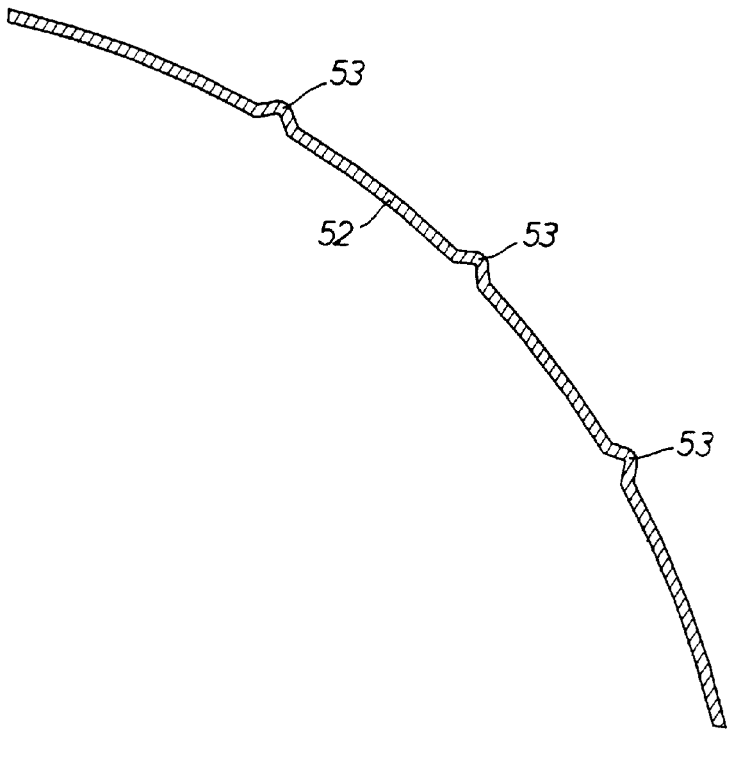
FIG. 6 shows a fractional view of a heat screen shell.

As illustrated in the drawing figures, the first air gap 33 between the shell 32 and the inner surface 29 of the housing 10 is very narrow, and it is to be noted that the air gap necessary to obtain the low heat transition coefficient could be very small, down to molecule size. This means that there is in fact no need for any means to keep up the size of the air gap. In some cases, though, it might be useful to provide the shell 32 with some kind of distance keeping means. An example to this is illustrated in FIG. 6, which shows a fraction of a heat screening shell 52 which is formed with punched-out dents forming projections 53 on the outside of the shell 52. By spreading a number of such projections 53 over the shell 52 a certain width of the air gap 33 relative to the surface 29 is positively maintained.

It should be noted that the heat screening concept of the invention is based on the low gas-to-solid material heat transition coefficient, and not at all on the heat insulating properties of the very material used for the heat screening shells. This means that the heat screening shells in themselves have substantially no heat insulating properties. Should, accordingly, the heat screening shells be made of a plastic material, which material has fairly good heat insulating properties, the shells are thin enough not to offer any heat insulation by themselves. So, regardless of what material is used for the heat screening shells, the shells have in themselves substantially no heat insulating properties.

Figure 5:
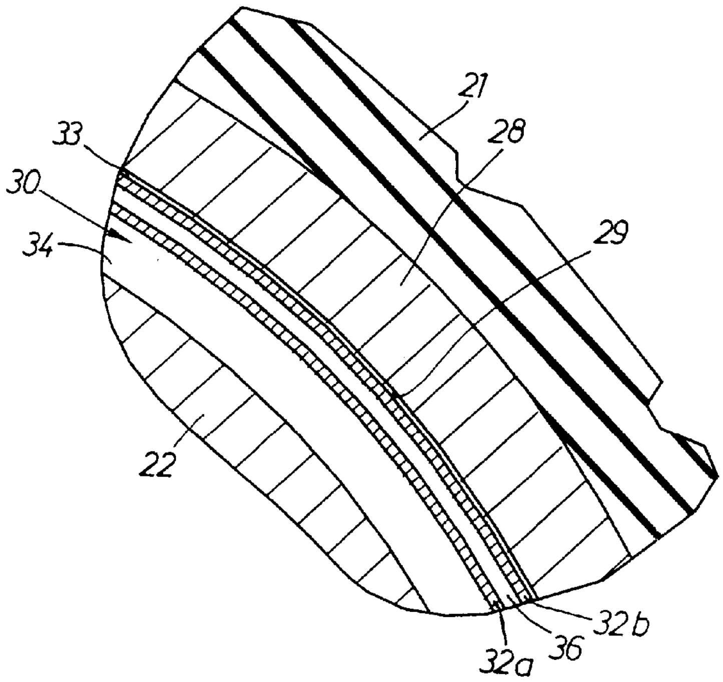
FIG. 5 shows a similar view as FIG. 4, but illustrates an alternative embodiment of the invention.

The embodiments of the invention are not limited to heat screening devices comprising just one heat screening shell. In FIG. 5 there is illustrated an embodiment of the invention including two tubular shells 32*a*, 32*b* arranged coaxially with each other with one of them disposed inside the other leaving an air gap 36 between them. This arrangement means that the heat transfer between the motor and the housing is further retarded, because the employment of two heat screening shells means four serial gas-to-metal heat transitions, each with a low heat transition coefficient.

During operation of the above described pneumatic power tool, pressure air is supplied through the air inlet 12 and fed to the motor 11 via the throttle valve 13 and the air inlet ports 24. When entering the cylinder chamber 23, the pressure air starts acting on the rotor vanes 27, thereby rotating the rotor 26. Having passed the cylinder chamber 23, the air is exhausted through the outlet port 25 into the tubular space 30 between the stator 22 and the inner surface 29 of the housing 10, specifically, the second air gap 34 between the stator 22 and the heat screening shell 32.

When passing through the cylinder chamber 23 and performing a work under expansion, the air loses a lot of heat, and when the air leaves the motor through the outlet port 25, the temperature thereof has decreased substantially. In many cases the temperature of the exhaust air is below zero degrees centigrade. The operator is protected from this low temperature in that the relative heat of the operators hands has to pass:

I) the outer insulating plastic lining 21 and the housing wall 28,

II)from the inner surface 29 of the housing wall 28 to the air in the first air gap 33, III)from the air in the air gap 33 to the shell 32, IV)from the shell 32 to the air in the second air gap 34, and V)from the air in the second air gap 34 to the stator 22.

In all four gas-to-metal heat transitions, there is a low heat transition coefficient, which means that the overall heat transfer is very slow. This means in turn that the operator is not exposed to the uncomfortable cold developed in the motor.

In the case of employing two or more heat screening shells, like 23*a*, 23*b* shown in FIG. 5, the heat transfer is further retarded and the outer temperature of the tool housing 10 is even more comfortable for the operator.

Though not specifically described by way of example, the invention is equally applicable to an electric power tool where the heat screen is intended to operate the other way round, namely to reduce heat transfer from the motor to the housing. In such applications of the invention, the heat developed in the electric motor has to pass at least four transition steps between gaseous media and metal surfaces before reaching the operators hands.

What is claimed is:

1. A portable power tool comprising:

a housing adapted to enable manual support of the tool, said housing being formed with an inner surface;

a motor located in said housing, said motor having a stator which is surrounded by said inner surface of said housing; and at least two tubular heat screening shells, disposed coaxially to one another, provided between said motor stator and said inner surface of said housing, said heat screening shells themselves having substantially no heat insulating properties;

wherein a first air gap is provided between a first one of said heat screening shells and said inner surface of said housing, a second air gap is provided between a second one of said heat screening shells and said stator, and a third air gap is formed between said first and second heat screening shells.

2. The portable power tool according to claim 1, wherein said stator and said inner surface of said housing are substantially cylindrical in shape and form therebetween a tubular space in which said at least tubular two heat screening shells are confined.

3. The portable power tool according to claim 1, wherein at least one of said two tubular heat screening shells is formed with a number of projections that abut against one of said motor stator and said inner surface of said housing to thereby maintain at least one of said first and second air gaps.

4. The portable power tool according to claim 1, wherein said tubular heat screening shells are made of sheet metal.

5. The portable power tool according to claim 1, wherein said motor is a pneumatic motor having at least one air outlet port opening laterally on said stator, said housing is provided with an air outlet passage, and said second air gap is arranged to form an air passage for connecting said at least one air outlet port with said air passage in said housing.

6. A portable power tool comprising:

a housing adapted to enable manual support of the tool, said housing being formed with an inner surface;

a motor located in said housing, said motor having a stator which is surrounded by said inner surface of said housing; and at least one heat screening shell provided between said motor stator and said inner surface of said housing, said heat screening shell itself having substantially no heat insulating properties;

wherein a first air gap is provided between said at least one heat screening shell and said inner surface of said housing, and a second air gap is provided between said at least one heat screening shell and said stator; and wherein said motor is a pneumatic motor having at least one air outlet port opening laterally on said stator, said housing is provided with an air outlet passage, and said second air gap is arranged to form an air passage for connecting said at least one air outlet port with said air passage in said housing.

7. The portable power tool according to claim 6, wherein said stator and said inner surface of said housing are substantially cylindrical in shape and form therebetween a tubular space in which said at one heat screening shell is confined.

8. The portable power tool according to claim 6, wherein said at least one heat screening shell is formed with a number of projections that abut against at least one of said motor stator and said inner surface of said housing to thereby maintain at least one of said first and second air gaps.

9. The portable power tool according to claim 6, wherein said at least one heat screening shell is made of sheet metal.

10. The portable power tool according to claim 6, wherein said at least one heat screening shell comprises at least two tubular shells disposed coaxially to one another with a third air gap formed therebetween.

11. A portable power tool comprising:

a housing adapted to enable manual support of the tool, said housing being formed with a substantially cylindrical inner surface; and a motor located in said housing, said motor having a stator which is surrounded by said inner surface of said housing with a tubular space formed therebetween;

at least one heat screening shell, made of sheet metal, provided between said motor stator and said inner surface of said housing in said tubular space, said heat screening shell itself having substantially no heat insulating properties;

wherein a first air gap is provided between said at least one heat screening shell and said inner surface of said housing, and a second air gap is provided between said at least one heat screening shell and said stator;

wherein said at least one heat screening shell is formed with a number of projections that abut against at least one of said motor stator and said inner surface of said housing to thereby maintain at least one of said first and second air gaps.

12. The portable power tool according to claim 11, wherein said at least one heat screening shell comprises at least two tubular shells disposed coaxially to one another with a third air gap formed therebetween.

13. The portable power tool according to claim 11, wherein said motor is a pneumatic motor having at least one air outlet port opening laterally on said stator, said housing is provided with an air outlet passage, and said second air gap is arranged to form an air passage for connecting said at least one air outlet port with said air passage in said housing.

* * * * *

UNITED STATES PATENT AND TRADEMARK OFFICE

CERTIFICATE OF CORRECTION

PATENT NO. : 6,163,094
DATED : December 19, 2000
INVENTOR(S) : Anders Urban Jansson It is certified that error appears in the above-identified patent and that said Letters Patent is hereby corrected as shown below:

Column 5,
Line 7, after "at" insert -- least --.

Signed and Sealed this

Fifteenth Day of October, 2002

*Attest:*

JAMES E. ROGAN

*Attesting Officer*

*Director of the United States Patent and Trademark Office*